US006941109B2

United States Patent
Matsushita et al.

(10) Patent No.: US 6,941,109 B2
(45) Date of Patent: Sep. 6, 2005

(54) COMPUTING NETWORK PATH DELAYS SO ACCURATE ABSOLUTE TIME CAN BE FORWARDED FROM A SERVER TO A CLIENT

(75) Inventors: Hiroshi Matsushita, San Francisco, CA (US); Paul W. McBurney, San Francisco, CA (US)

(73) Assignees: Seiko Epson Corporation, Tokyo (JP); eRide, Inc., San Francisco, CA (US)

( * ) Notice: Subject to any disclaimer, the term of this patent is extended or adjusted under 35 U.S.C. 154(b) by 521 days.

(21) Appl. No.: 10/079,251

(22) Filed: Feb. 19, 2002

(65) Prior Publication Data

US 2003/0157886 A1 Aug. 21, 2003

(51) Int. Cl.[7] ................................................ H04B 7/19
(52) U.S. Cl. ...................... 455/13.2; 455/13.1; 455/9; 342/357.02; 342/357.06
(58) Field of Search ........................ 455/13.1, 13.2, 455/9, 427, 12.1, 502; 342/357.09, 357.06, 357.12; 370/400, 392, 416, 444

(56) References Cited

U.S. PATENT DOCUMENTS

| 6,131,067 A | 10/2000 | Girerd et al. |
| 6,185,427 B1 | 2/2001 | Krasner et al. |
| 6,437,734 B1 * | 8/2002 | McBurney et al. ..... 342/357.09 |
| 2002/0135511 A1 | 9/2002 | Zhao et al. |
| 2003/0031185 A1 * | 2/2003 | Kikuchi et al. ............. 370/400 |

* cited by examiner

*Primary Examiner*—Sonny Trinh
*Assistant Examiner*—Phuoc Doan

(57) ABSTRACT

A navigation-satellite receiver support data network comprises a server connected to the Internet to provide initialization information to clients for faster cold starts. The server includes a GPS receiver that provides for tracking of a constellation of navigation satellites. When a client is started cold, time and frequency are initially unknown to it. Test messages are sent back and forth over the Internet and a path delay time is computed from the average of the quickest transit times. This yields the offset time between the server's time system and the client's time system. The server sends current time information to the client, and the computed path delay is added. The client can then compute correct time from the server and path delay information, and thereby select much sooner which satellites are correct to search.

6 Claims, 2 Drawing Sheets

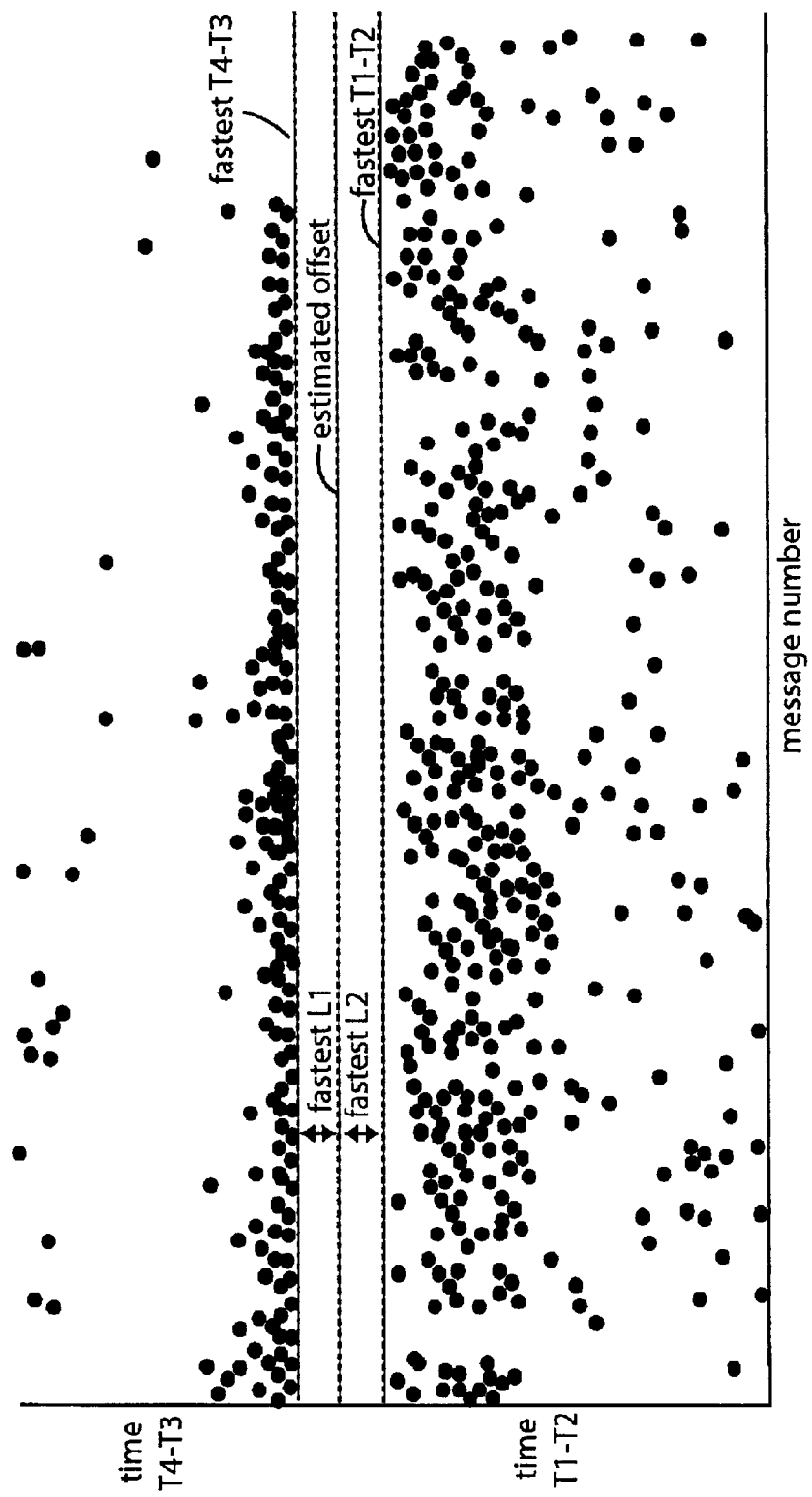

COMPUTING NETWORK PATH DELAYS SO ACCURATE ABSOLUTE TIME CAN BE FORWARDED FROM A SERVER TO A CLIENT

FIELD OF THE INVENTION

The present invention relates to using a network server that knows accurate, absolute time to communicate that to a network client, and more particularly to methods and systems for estimating the network path delays between the server and client so the time information can be appropriately corrected.

DESCRIPTION OF THE PRIOR ART

Global positioning system (GPS) receivers use signals received from several earth-orbiting satellites to determine navigational data such as position and velocity. A navigation receiver that has just been turned on does not yet know how much its crystal oscillator is in error, nor does it know accurate time. Both these are needed to find and lock on to the satellite transmissions. During initialization, a navigation satellite receiver will search through both the time and frequency spectrums to find available satellites. But a blind search can take a very long time. So a navigation satellite receiver can be assisted in its initialization by another one that does know accurate time.

A problem arises in communicating accurate, absolute time over a network. There is no guarantee that any particular data packet sent out on the Internet will actually be delivered at its destination. Best efforts are used. Such data packets will also follow different connections through the network and experience a highly variable set of delays. So it is uncertain how long any one data packet will be delayed. If a server on a network knows accurate time and transmits it, the uncertain arrival time of the data packets will degrade the worth of the time information.

SUMMARY OF THE INVENTION

It is therefore an object of the present invention to provide an Internet based service that can provide correct time information to a client.

It is another object of the present invention to provide a method and system for improving the time needed for initialization of network client navigation devices.

It is a further object of the present invention to provide a satellite-navigation system that is inexpensive.

Briefly, a navigation-satellite receiver support data network embodiment of the present invention comprises a server connected to the Internet to provide initialization information to clients for faster cold starts. The server includes a GPS receiver that provides for tracking of a constellation of navigation satellites. When a client is started cold, time and frequency are initially unknown to it. Test messages are sent back and forth over the Internet and a path delay time is computed from the average of the quickest transit times. This yields the offset time between the server's time system and the client's time system. The server sends current time information to the client, and the computed path delay is added. The client can then compute correct time from the server and path delay information, and thereby select much sooner which satellites are correct to search. An advantage of the present invention is that a system and method are provided that substantially improve the time-to-first-fix of client navigation receivers.

Another advantage of the present invention is that a system and method are provided that lead to reduced equipment and usage costs.

These and other objects and advantages of the present invention will no doubt become obvious to those of ordinary skill in the art after having read the following detailed description of the preferred embodiments which are illustrated in the various drawing figures.

IN THE DRAWINGS

FIG. 3 is a scattergram of test results that were obtained when trial messages were sent between a server and a client and back again.

DETAILED DESCRIPTION OF THE PREFERRED EMBODIMENT

Figure 1:
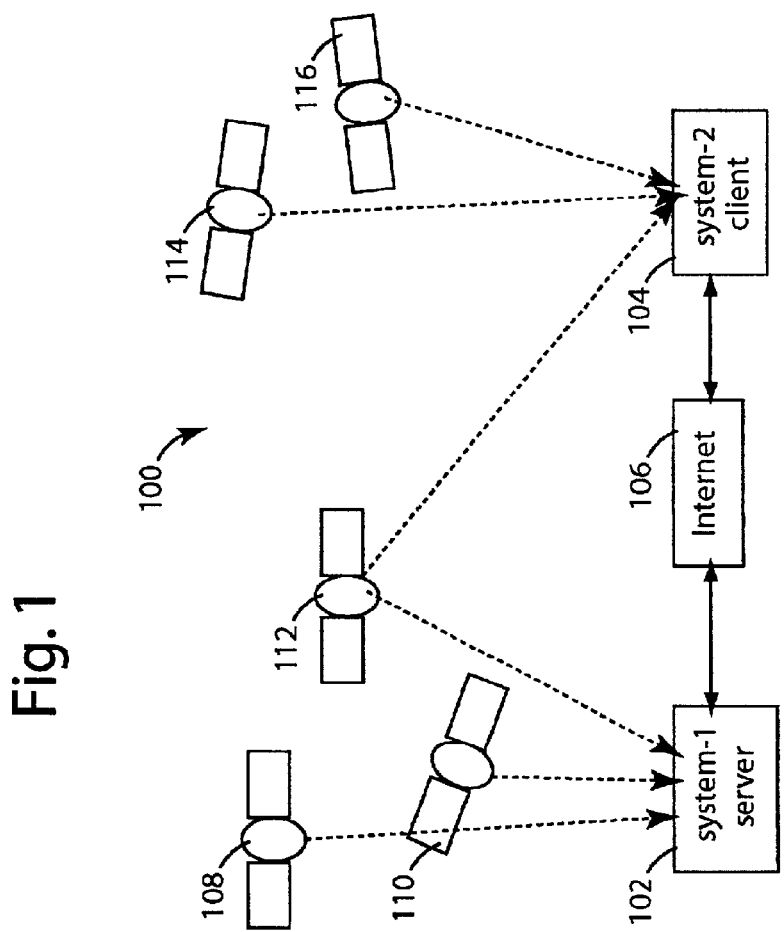
FIG. 1 is a functional block diagram of a network system embodiment of the present invention wherein a server is assisting a client with time information communicated over the Internet.

FIG. 1 illustrates a network system 100, in an embodiment of the present invention, that includes a server system (system-1) 102, a client system (system-2) 104, and an intervening computer network 106 such as the Internet. The server system 102 includes a navigation satellite receiver that has locked onto and is tracking a constellation of navigation satellites 108, 110, and 112. Some of these may also be visible to the client system 104. Another constellation of navigation satellites, including 114 and 116 is visible to client system 104. The client system 104 includes its own navigation satellite receiver, but such may not have yet locked onto and be tracking its constellation of navigation satellites 112, 114, and 116.

The server system 102 is intended to be always on and tracking its constellation of navigation satellites 108, 110, and 112. It is then able to discern accurate, absolute system time and may also provide current ephemeris, troposphere, ionosphere, and other information to other, not-yet-initialized navigation satellite receivers. Such information all needs to be determined during initialization, and spoon feeding any of it from another source will dramatically improve time-to-first-fix.

FIG. 1 illustrates an Internet infrastructure that is able to spoon-feed, or aid, any number of client systems online. Such information can be provided as a service, on a per-use charge or as a subscription.

Critical to embodiments of the invention is the providing of accurate, absolute system time information by the server system 102 to the client system 104 over the Internet 106. Also critical is the ascertaining of the path delay encountered by data packets traversing the Internet 106 between the server system 102 to the client system 104. The path delay estimate may be added into the time information sent by the server system 102, e.g., so it arrives at client system 104 at the time stated in the payload. Or, the payload of the data packet may have the correct time when it was launched and the client system 104 adds in the estimated path delay to arrive at correct time after its travel and delivery.

The advantages of the present invention are realized when the client system 104 is just being turned on and needs to have frequency information on its own local oscillator and the correct, absolute system time. Until these quantities are known, the client system will have to engage in a trial-and-error search. For example, postulating a variety of possible times and frequencies.

Figure 2:
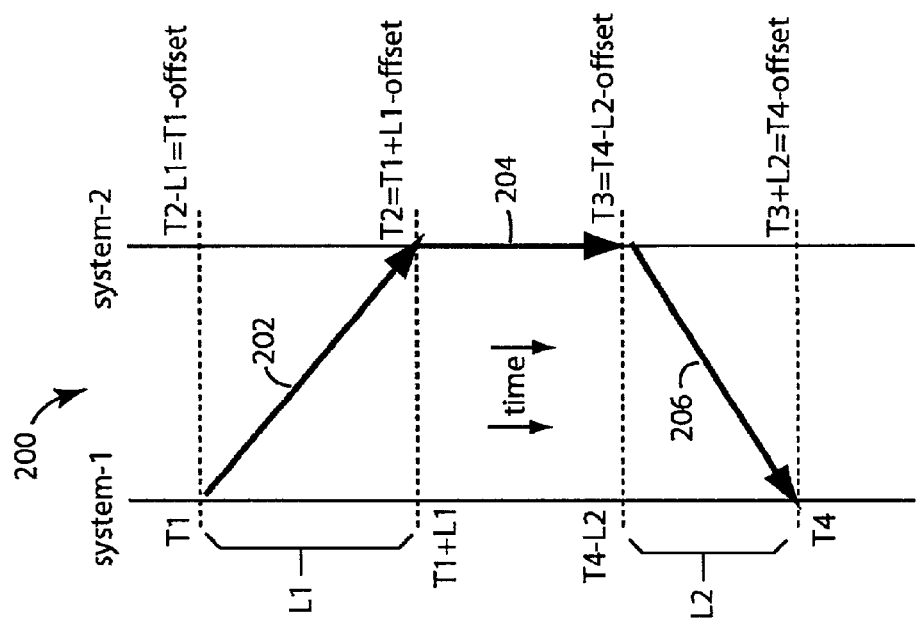
FIG. 2 is a schematic diagram of the relationships between time-of-launch, time-of-flight, and time-of-receipt of data packets communicated over the Internet as in the network system in FIG. 1.

FIG. 2 represents an infrastructure-aiding system 200 in which a system-1 is a server and a system-2 is a client. FIG. 2 illustrates the problem caused by the indeterminate delays experienced by data packets traversing the Internet. At a time T1, a time data packet 202 is launched at system-2. The time-of-flight is latency L1. The time of launch is determined at system-2 by working back from its receipt of data packet 202 at time T2, e.g., T2−L1=T1−offset. And, T2=T1+L1−offset. At system-1, the time of receipt at system-2 is T1+L1. A turn-around process 204 launched an answering data packet 206 at time T3, e.g., T3=T4−L2−offset. The latency L2 is the time-of-flight. The answering data packet 206 arrives at system-1 at T4. System-2 puts this at T3+L2=T4−offset. A simultaneous equation can therefore find the "offset" variable.

Experiments were conducted in a real network to determine actual values for T1−T2 and T4−T3. The test messages were observed to have been delayed by various amounts.

FIG. 3 represents the results of a series of tests. The fastest times for T4−T3 and T1−T2 tended to bunch up against two limit lines with a gap in between. Such gap was on the order of fifteen milliseconds. The estimated offset was then taken as the centerline of the gap. The calculation of the offset is not the average of all T4−T3 and T1−T2. Instead, only the maximum values of T1−T2 and the minimum values of T4−T3 are used. It follows that MAX(T1−T2)<offset<MIN(T4−T3). Reducing this to a formula for offset, $$\text{offset} = \frac{T1 - T2 + \left(\frac{L1}{L2}\right)(T4 - T3)}{1 + \left(\frac{L1}{L2}\right)}.$$

Therefore a method embodiment of the present invention sends a series of test messages from the server to the client and back. The values for the maximum values of T1−T2 and the minimum values of T4−T3 are averaged to find the offset value. Correct, absolute time at the server plus the offset time, yields the correct absolute time at the client. Such time is used by the client to initialize itself for quicker tracking and lock onto the satellites in its constellation.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the "true" spirit and scope of the invention.

What is claimed is:

1. A network-assisted navigation satellite receiver system, comprising:
   a network server with an initialized first navigation satellite receiver for discerning accurate, absolute satellite system time;
   a network client remote from the network server and associated with an uninitialized second navigation satellite receiver that does not yet know said satellite system time;
   an interconnecting network between the network server and the network client, and that imposes a non-deterministic time delay on messages, and for communicating a network-transmission delay-corrected estimate of said satellite system time from the network server to the network client;
   a message latency testing means for determining the fastest transit times of messages from the network server to the network client (L1), and for determining the fastest transit times of return messages from the network client to the network server (L2); and
   an offset calculator for computing the average of the fastest transit times L1 and L2 and from that said network-transmission delay-corrected estimate of said satellite system time for the network client;
   wherein, said network-transmission delay-corrected estimate of said satellite system time is provided for use by said second navigation satellite receiver to quicken its initialization.

2. A network-assisted navigation satellite receiver system, comprising:
   a network server with a first navigation satellite receiver for computing accurate, absolute time;
   a network client with a second navigation satellite receiver and operating according to a relative time;
   an interconnecting network for communicating information related to said accurate, absolute time from the network server to the network client, and that imposes a non-deterministic time delay on messages;
   a message latency testing means for determining the fastest transit times of messages from the network server to the network client (L1), and for determining the fastest transit times of return messages from the network client to the network server (L2); and
   an offset calculator for computing said offset time from the average of the fastest transit times L1 and L2;
   wherein, a solution at the network client by the offset calculator of said offset time added to said accurate, absolute time, provides for improved receiver initialization; and
   wherein the offset calculator provides for a solution to said offset that can be expressed as, $$\text{offset} = \frac{T1 - T2 + \left(\frac{L1}{L2}\right)(T4 - T3)}{1 + \left(\frac{L1}{L2}\right)},$$

where, T1 is the time a test message leaves the network server, T2 is the time that message arrives at the network client, T3 is the time a return message leaves the network client, T4 is the time that return message arrives at the network server, L1 is T1−T2, and T2 is T4−T3.

3. A network-assisted navigation satellite receiver system, comprising:
   a network server with an initialized first navigation satellite receiver for discerning accurate, absolute satellite system time, and providing for connection to a data network;
   a network client remote from the network server and associated with an uninitialized second navigation satellite receiver that does not yet know said satellite system time, and further providing for connection to said data network;
   a message latency testing means for determining the transit times of messages from the network server to the network client (L1), and for determining the transit times of return messages from the network client to the network server (L2); and an offset calculator for computing the average of transit times L1 and L2 and for computing a network-transmission delay-corrected estimate of said satellite system time for the network client;

wherein, said network-transmission delay-corrected estimate of said satellite system time is provided for use by said second navigation satellite receiver to quicken its initialization.

4. A method for fast initialization of a navigation satellite receiver, the method comprising the steps of:

locking onto and tracking a first constellation of navigation satellites with a first navigation satellite receiver;

obtaining absolute satellite system time with said first navigation satellite receiver;

providing a server on a network for transmitting a network delay-corrected estimate of said absolute satellite system time;

connecting as a client to said network;

testing a path delay of said network between said server and said client to determine a network delay;

using said network delay and said absolute satellite system time to produce said network delay-corrected estimate and to deliver such to said client;

providing a second navigation satellite receiver located at said client with said network delay-corrected estimate of absolute satellite system time such that it may find and lock onto a second constellation of navigation satellites;

wherein, said second navigation satellite receiver is enabled by a priori time information to more quickly initialize itself.

5. The method of claim 4, further comprising the step of:

charging a fee to a user of said client for providing said a priori time information.

6. A method for selecting which GPS satellites are correct for a GPS receiver to search for during a cold start, comprising:

cold starting a first GPS receiver which is associated with a network client;

providing a server that includes a second GPS receiver already tracking a constellation of navigation satellites and obtaining therefrom GPS system time;

testing network communication delays between said network client and server by averaging a selection of the quickest times test messages traveled between them;

estimating GPS system time for said first GPS receiver by adding the result of the step of testing to GPS system time determined by said second GPS receiver; and using an estimate, obtained in the previous step, in said second GPS receiver to select which GPS satellites are correct to search for signal during initialization.

* * * * *